United States Patent [19]

Davidov

[11] Patent Number: 4,688,247
[45] Date of Patent: Aug. 18, 1987

[54] PAY TV SCRAMBLING BY AUDIO ENCRYPTION

[75] Inventor: Mircho A. Davidov, Danville, Calif.

[73] Assignee: Oak Industries Inc., Rancho Bernardo, Calif.

[21] Appl. No.: 870,866

[22] Filed: Jun. 5, 1986

[51] Int. Cl.⁴ .......................................... H04N 7/167
[52] U.S. Cl. ........................................ 380/19; 380/20
[58] Field of Search ................. 358/121, 122; 380/19, 380/20

[56] References Cited

U.S. PATENT DOCUMENTS

| 4,318,125 | 3/1982 | Shutterly | 358/121 |
| 4,410,911 | 10/1983 | Field et al. | 358/121 |
| 4,603,349 | 7/1986 | Robbins | 358/121 |

Primary Examiner—Stephen C. Buczinski
Attorney, Agent, or Firm—Kinzer, Plyer, Dorn & McEachran

[57] ABSTRACT

A subscription television distribution system provides a plurality of sources of television program channels, each of which include a video signal and an encrypted audio signal with the encrypted audio signal including encrypted control and subscriber address data. There is a communication link connecting the plurality of sources with at least one receiving site such as a cable system head end which has means for receiving the plurality of television channels. At the receiving site, the encrypted audio signals are separated from the television channel and are multiplexed together on an non-television channel carrier. An identifying tag is added to each of the video signals for use in subsequently selecting the audio signal corresponding to its associated video signal when the encrypted audio signals are demultiplexed at subscriber locations. At each subscriber there is a TV audio decrypter which selects the tag from a video signal and uses that tag to demultiplex a particular audio signal. The audio signal is then decrypted and is combined with the video signal to provide program information for the subscriber.

9 Claims, 2 Drawing Figures

4,688,247

PAY TV SCRAMBLING BY AUDIO ENCRYPTION

SUMMARY OF THE INVENTION

The present invention relates to a subscription television system in which the audio portion of subscription programs is separated from the video for transmission to subscribers and in which the video signals each carry an identifying tag for selecting the appropriate audio from a demultiplexer at each subscriber location.

Another purpose is a subscription television decoder which has means for selecting the audio signal corresponding to a received video signal from a group of multiplexed audio signals.

Another purpose is a subscription television system of the type described in which the video signal may or may not be scrambled and in which the audio signal is encrypted and in which each video signal carries an identifying tag for use in selecting the corresponding audio signal.

Another purpose is a TV subscription decoder which includes means for decrypting an audio signal and for descrambling a video signal and in which the video signal carries an identifying tag for use in selecting the appropriate audio signal from a plurality of audio signals.

Other purposes will appear in the ensuing specification, drawings and claims.

BRIEF DESCRIPTION OF THE DRAWINGS

The invention is illustrated diagrammatically in the following drawings wherein.

DETAILED DESCRIPTION OF THE PREFERRED EMBODIMENT

The present invention has utility in various types of subscription television distribution systems. It may be used as a part of a cable system, with or without a satellite distribution system and in various other types of subscription television distribution systems in which the audio and/or video signals are encoded or encrypted so as to provide security for the transmitted information. Various types of video scrambling and audio encryption may be utilized and the invention should not be limited to any particular code arrangement. For example U.S. Pat. Nos. 4,340,906; 4,353,088; 4,336,553; and 4,424,532 all relate to a type of video scrambling which may find use in the present invention. Similarly, U.S. Pat. Nos. 4,531,021 and 4,531,020 both disclose types of audio encryption which may be used with the present invention.

Figure 1:
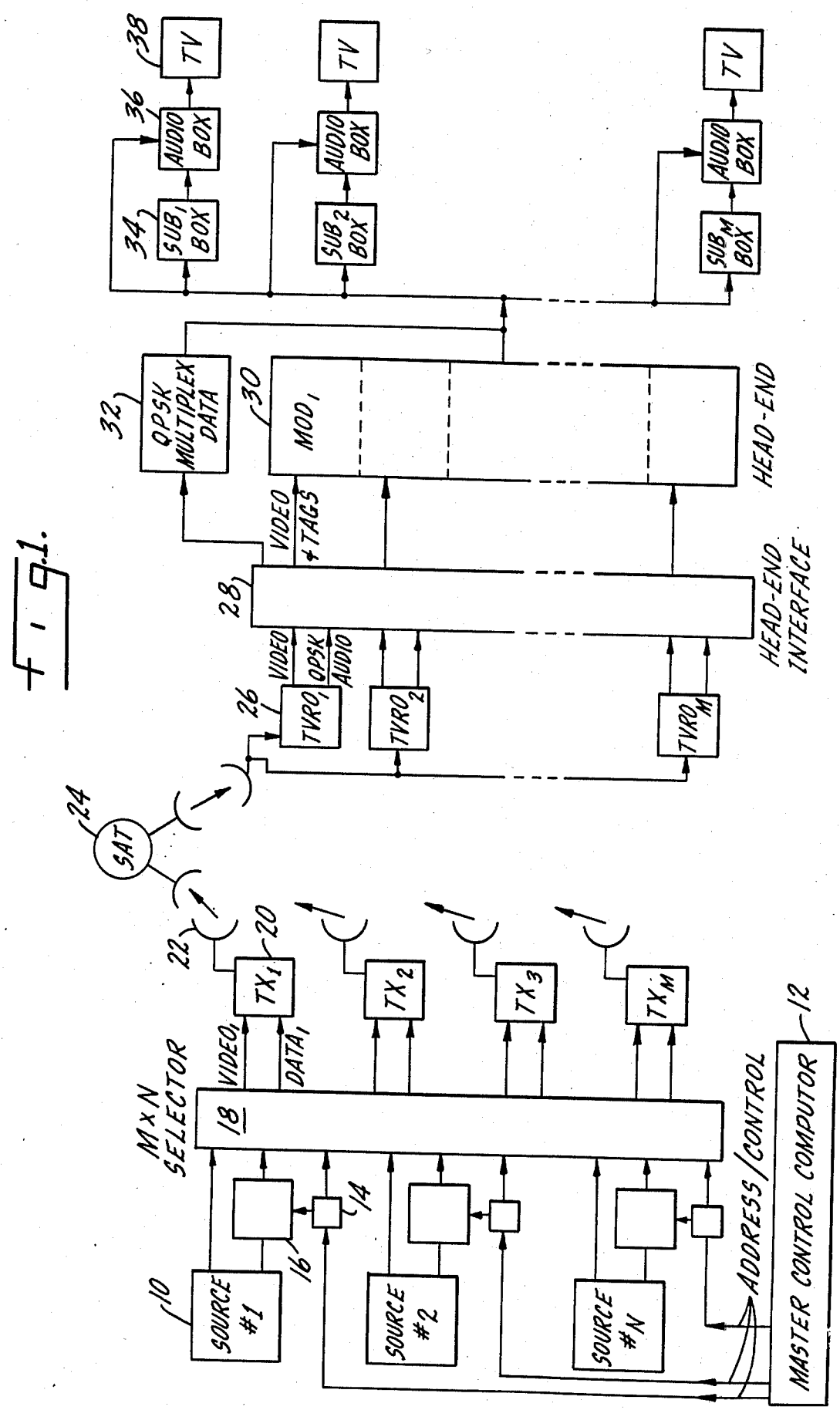
FIG. 1 is a diagrammatic illustration of a television subscription distribution system of the type described.

In FIG. 1, a plurality of sources of television signals, both video and the audio associated therewith, are indicated at 10 with the sources being designated source 1 through source N. Thus the transmitting site may have any number of television channels or television program sources. A master control computer 12 will provide control data for the descrambling and/or decrypting of the video and audio signals respectively, if the video is scrambled, and will also provide address information which is to be associated with the television channels for use in controlling system subscribers. Master control computer 12 is connected to a plurality of address control units 14, each of which are connected to audio processors 16 which in turn are connected to the television channel sources 10. The data from the master control computer 12 is fed to the address control units 14 and from there to the audio processor where the audio signal from the television channels are encrypted, for example, in the manner described in one or the other of the above patents relating to audio encryption. Not only is the audio signal encrypted, but the control data and address information is similarly encrypted. The data may be in a QPSK format. Each of the television sources designated 1 through N are connected to an M×N selector 18 as are each of the audio processors 16. Selector 18 in turn is connected to a plurality of transmitters 20 designated 1 through M whereby the video signals from the program sources and the accompanying encrypted data, are transmitted by antennae 22 to a satellite indicated at 24. The satellite provides a communication link between the transmitting site and one of a plurality of receiving sites, one of which is illustrated at the right hand side of FIG. 1.

At each receiving site, and the site indicated at the right side of FIG. 1, may be a typical cable television distribution system; there are a plurality of television receive only units indicated at 26 which will receive the TV channels from the transmitting site. In each case, television receiver 26 will provide an output of a video signal and a QPSK encrypted audio signal and these signals will all be passed to a head end interface 28. At the head end interface, each of the video signals will have added thereto an identifying tag which may be an in channel tag and the video signal and its tag will be connected to a modulator 30, there being a modulator for each of the television channels to be transmitted from the head end. The modulator will send out over the cable distribution system the video signal at an appropriate RF frequency for the cable system. All of the encrypted audio signals will be multiplexed in a multiplexer 32 and will be separately transmitted on the cable at a non-TV channel carrier frequency, for example, at an FM frequency. Thus, the distribution of the program information on the cable system will be in the form of video signals with an identifying tag at an RF television carrier frequency and the combined QPSK encrypted audio information and control data on the cable at a non-TV channel frequency.

Each subscriber location will include what is designated as a subscriber box 34, an audio box 36 and a television receiver 38. The video signal will be fed to the subscriber box which may be a conventional television converter such as shown in U.S. Pat. No. 3,333,198 and if the video signal is scrambled, it may or may not be descrambled in the subscriber box. The output from the subscriber box will be a video signal at RF frequency, typically a locally unused channel, which will be connected to the audio box. The audio box, as described in connection with FIG. 2, will receive the multiplexed audio data and will select an audio signal appropriate for the video signal selected by the subscriber box 34 and will combine the selected video and audio signals for use by television receiver 38.

Figure 2:
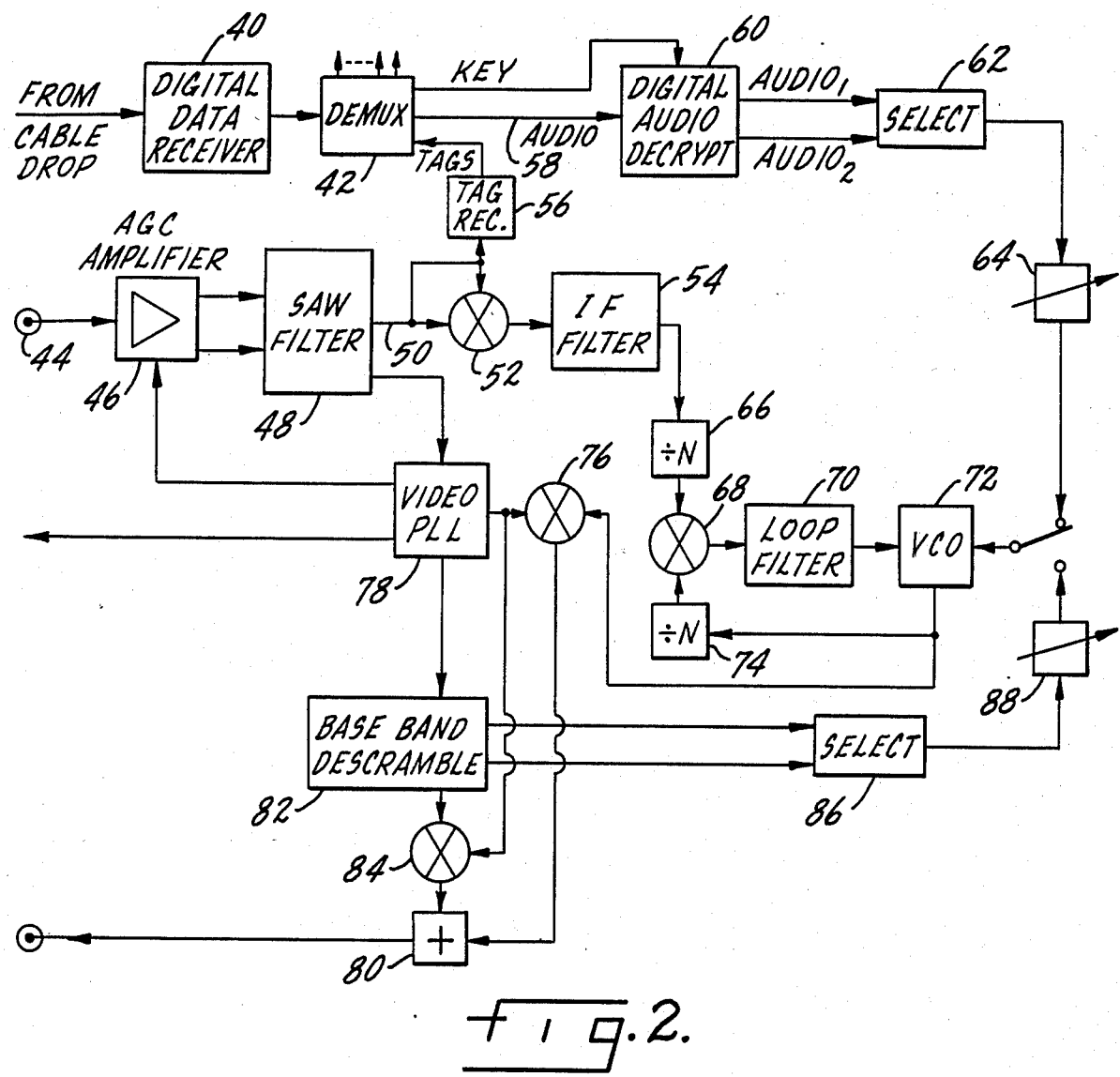
FIG. 2 is a diagram illustrating the audio decoder used in the distribution system of FIG. 1.

FIG. 2 illustrates one form of audio subscriber control unit. A digital data receiver 40 receives the incoming multiplexed audio signals and is connected to a demultiplexer 42. The input from subscriber box 34 is indicated at 44 and is connected to an AGC amplifier 46. The signal from subscriber box 34 will be both the video signal described and the associated audio carrier signal which may or may not have audio information on it. The output from AGC amplifier 46 will be the video signal and the audio carrier with or without audio information and it will be passed to a SAW filter 48.

There are two outputs from SAW filter 48. One output, on line 50, includes the video and audio modulated RF carriers, each with common mode spurious deviation, which are connected to an intercarrier detector 52. Detector 52 multiplies the video and audio RF carriers with the resultant being an intermediate frequency carrier signal modulated by the audio information if such is present and without common mode spurious deviation which was removed in the intercarrier detector. One output from detector 52 is connected to an IF filter 54. Since the output from the detector will include multiplication products other than the desired IF frequency of 4.5 mhz, the IF filter is required.

The other output from detector 52 is connected to a tag receiver 56 which will identify the tag associated with the particular video signal and will provide an output of this tag to demultiplexer 42 whereby the encrypted audio signal associated with the selected video signal will be provided at the output of the demultiplexer on line 58 along with the encrypted key for the audio signal, assuming such key is part of the encrypted audio data. The encrypted audio and the key for decrypting it are both connected to a digital audio decrypt circuit 60 with the output of this circuit being one or two channels of audio which in turn are connected to a selector 62. Selector 62 is connected to a remote volume control 64 whereby the audio signal may have the volume controlled before it is combined with the video information.

Connected to the output of IF filter 54 is a divide circuit 66 which will divide the 4.5 mhz signal down to a suitable reference frequency with the output of the divide circuit being connected to a mixer 68. Mixer 68 is connected to a filter 70 with the resultant reference frequency being connected to a voltage controlled oscillator (VCO) 72 which receives as its other input the audio signal from remote volume control circuit 64. The deviation control for VCO 72 is provided by volume control 64 which is the audio signal at base band frequency. In order to maintain the nominal frequency of VCO 72 at the proper IF level, the output from the VCO is connected to a second divide circuit 74 which provides the other input for mixer 68. Thus, the combination of the two divide circuits, mixer 68 and filter 70 are effective to lock VCO 72 at a 4.5 mhz IF signal.

The output from VCO 72 is a 4.5 mhz IF signal, audio modulated and without common mode spurious deviation which is connected to a mixer 76.

A second output from SAW filter 48 is the video modulated RF carrier, with or without scrambling, but with the audio carrier suppressed by 45–60 db. This signal is connected to a video phase lock loop 78, one output of which is connected to AGC amplifier 46 with another output providing an AFC control signal for subscriber converter 34. A third output from phase lock loop 78 is the video carrier with common mode spurious deviation, but without the video modulation. This signal is connected to mixer 76. The output from mixer 76 will be an audio modulated carrier signal, at the appropriate RF frequency and with common mode spurious deviation which has not been affected by the volume control applied to the audio signal. The output from mixer 76 is connected to a combining circuit 80.

An additional output from phase lock loop circuit 78 is the video signal, and in this instance with video scrambling by way of example, and this is connected to a base band descrambler 82. The descrambler is connected to a mixer 84 which combines the unscrambled base band video signal with the video RF frequency from phase lock loop 78 to provide an unscrambled video signal at RF frequency to combining circuit 80. The output of the combining circuit is a decrypted audio signal at RF frequency and a descrambled video signal at RF frequency, both of which can be used in television set 78.

If the video signal and the audio signal provided at the output of subscriber box 34 also includes audio information such as described in U.S. Pat. Nos. 4,340,906; 4,353,088; 4,336,553; and 4,424,532, the base band descrambler will provide outputs of the audio information at audio base band frequency and these audio signals will be connected to a selector circuit 86 which in turn is connected to a remote volume control circuit 88 with the output from volume control 88 being an alternative to the output from volume control circuit 64. Thus the encrypted audio and audio channels associated with the scrambled video may be alternative audio information for the subscriber.

Whereas the preferred form of the invention has been shown and described herein, it should be realized that there may be many modifications, substitutions and alterations thereto.

The embodiments of the invention in which an exclusive property or privilege is claimed are defined as follows:

1. In a subscription TV distribution system, a plurality of sources of TV program channels, each including a video signal and an encrypted audio signal, with the encrypted audio signal including encrypted control and subscriber address data, a communications link connecting said plurality of sources with at least one receiving site having means for receiving said plurality of TV channels, means at a receiving site for separating the encrypted audio signal in each channel from the video signal, means at each receiving site for multiplexing the separated encrypted audio signals on a single non-TV channel carrier, means at each receiving site for including an identity tag on each video signal for use in selecting the corresponding audio signal from said plurality of multiplexed audio signals, and a plurality of subscribers in communication with said receiving site for receiving one or more of said video signals and said multiplexed audio signals, each subscriber having means for separating the tag from its associated video signal and using the separated tag to select the encrypted audio signal from the multiplexed audio signals which corresponds to the tag and its associated video signal, and means at each subscriber for decrypting the audio signal and its included control and address data.

2. The subscription TV distribution system of claim 1 further characterized in that at least one of said video signals is scrambled at the source, with each subscriber having means for descrambling the video signal.

3. The subscription TV distribution system of claim 2 further characterized in that the means for descrambling the video signal at each subscriber location is separate from and unrelated to the means for decrypting the audio signal.

4. The subscription TV distribution system of claim 2 further characterized in that the means at each subscriber for using the separated tag to select an audio signal and the means for decrypting the audio signal is associated with the means for descrambling said video signal.

5. A TV audio decrypter for use with a TV subscription distribution system in which a plurality of encrypted audio signals are multiplexed together on a non-TV channel carrier and in which the corresponding plurality of video signals are transmitted separately, each with an identifying tag for its associated audio, including
   means for separating the tag from a video signal,
   means for using the separated tag to select the encrypted audio corresponding to the video signal tag,
   means for decrypting the separated audio, and
   means for combining the decrypted audio signal with the video signal.

6. The decrypter of claim 5 further characterized in that at least one of the video signals is scrambled, with said decrypter further including means for descrambling the video signal connected to the means for combining the decrypted audio and the video signal.

7. A TV audio decrypter for use with a TV subscription distribution system in which a plurality of encrypted audio signals are multiplexed together on a non-TV channel carrier and in which the corresponding plurality of video signals are transmitted separately, each with an identifying tag for its associated encrypted audio, including:
   a digital data receiver for receiving said multiplexed encrypted audio signals, a demultiplexer connected thereto,
   video signal receiving means, a tag receiver connected thereto for separating the video signal identifying tag, said tag receiver being connected to said demultiplexer for providing the audio selecting signal therefor,
   decrypting means connected to said demultiplexer for decrypting the selected audio signal, and
   means for combining the decrypted audio signal and the video signal from said video signal receiving means.

8. The decrypter of claim 7 further characterized in that at least one of said video signals is scrambled, and a video signal descrambler connected to said video signal receiving means and to said combining means whereby the scrambled video signal is descrambled prior to being combined with the decrypted audio signal.

9. The TV audio decrypter of claim 8 further characterized in that the video signals transmitted separately over the subscription television distribution system include audio signals, with said video descrambling means providing an output of both the descrambled video and the audio signals which accompany it, and means for selecting either the decrypted audio signal or the audio signal which accompanied the scrambled video for combining with the descrambled video.

* * * * *